United States Patent
Liu et al.

(10) Patent No.: US 9,305,338 B1
(45) Date of Patent: Apr. 5, 2016

(54) IMAGE DETAIL ENHANCEMENT AND EDGE SHARPENING WITHOUT OVERSHOOTING

(71) Applicant: Pixelworks, Inc., Portland, OR (US)

(72) Inventors: Guodong Liu, Shanghai (CN); Neil Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 181 days.

(21) Appl. No.: 14/106,448

(22) Filed: Dec. 13, 2013

(51) Int. Cl.
G06T 5/00 (2006.01)

(52) U.S. Cl.
CPC ....................... *G06T 5/002* (2013.01)

(58) Field of Classification Search
CPC . G06T 5/002; G06T 5/20; G06T 2207/20221; G06T 3/403; G06T 5/008; G06T 7/0085; G06T 5/003; G06T 2207/10016; G06T 2207/10024; G06T 2207/20028; G06T 2207/20192
USPC ........... 382/166, 266, 254, 263, 260, 12, 128; 348/630, 631
See application file for complete search history.

(56) References Cited

U.S. PATENT DOCUMENTS

| | | | | |
|---|---|---|---|---|
| 5,602,934 | A * | 2/1997 | Li | G01R 33/56 382/128 |
| 7,561,209 | B2 * | 7/2009 | Zhu | H04N 9/646 348/450 |
| 2005/0099545 | A1 * | 5/2005 | Zhu | H04N 9/646 348/630 |
| 2005/0122431 | A1 * | 6/2005 | Lee | H04N 9/646 348/631 |
| 2010/0067818 | A1 * | 3/2010 | Zhang | G06T 3/403 382/260 |
| 2010/0092087 | A1 * | 4/2010 | Cooksey | G06K 9/38 382/176 |
| 2011/0115815 | A1 * | 5/2011 | Xu | G06T 5/003 345/626 |
| 2012/0051635 | A1 * | 3/2012 | Kunkel | G06T 5/009 382/165 |
| 2014/0321768 | A1 * | 10/2014 | Tsai | G06T 5/002 382/263 |

* cited by examiner

*Primary Examiner* — Mekonen Bekele
(74) *Attorney, Agent, or Firm* — Marger Johnson

(57) ABSTRACT

A method can include receiving an input image, performing an edge-preservation enhancement on the input image, performing a local-extrema enhancement on the input image, and performing a digital transient improvement (DTi) operation on the input image. A gradient-based fusion of an output of the edge-preserving enhancement and an output of the local-extrema enhancement may be performed, and a transient-based fusion of an output of the gradient-based fusion and an output of the DTi operation may also be performed.

10 Claims, 2 Drawing Sheets

IMAGE DETAIL ENHANCEMENT AND EDGE SHARPENING WITHOUT OVERSHOOTING

CROSS-REFERENCE TO RELATED APPLICATION

This application is related to U.S. patent application Ser. No. 14/106,366, titled TWO-DIMENSIONAL DIGITAL TRANSIENT IMPROVEMENT and filed on Dec. 13, 2013, the content of which is fully incorporated by reference herein.

TECHNICAL FIELD

The disclosed technology pertains to image processing, and more particularly to techniques pertaining to image detail enhancement and edge sharpening.

BACKGROUND

Image enhancement techniques are essential for improving image quality. Sharp images delivered by effective enhancement techniques offer incomparable visual appeal to a viewer.

Traditional enhancement techniques enhance image detail by way of mask filters or other high-pass filters. Though such filters do enhance details, they also introduce many artifacts such as overshooting, halo effect, and ringing, and serve to make the processed image appear unnatural to the viewer.

Current edge-preserving enhancement methods may avoid overshooting, halo effect, and ringing artifacts but in so doing sacrifice the sharpening of edges. One technique includes progressively coarsening an image by way of an edge-preserving operator based on the weighted least squares (WLS) framework, constructing an edge-preserving multi-scale image decomposition, and then enhancing the details at multi-scales. This algorithm only enhances details that are not at an edge, however, and thus does not permit many image enhancement tasks. Moreover, the computation cost and time of WLS operations are significant because a WLS scheme needs a global optimization.

Other current techniques may achieve edge-aware detail enhancement through simple point-wise manipulation of Laplacian pyramids but, similar to the technique discussed above, this technique only enhances details that are not at an edge. Also, because for each pixel in every scale pixel remapping and Laplacian pyramids are computed in a region surrounding this pixel, the processing time and cost are both significant.

Other current techniques may enhance an image by way of a multi-scale morphology. Such techniques can achieve edge-sharpening without the above artifacts by increasing the value of a pixel (i.e., making the pixel brighter) if the pixel value is much closer to a local maximal pixel value than a local minimal one; otherwise, the pixel value is decreased, i.e., the pixel is made darker. Although this enhancement performance is generally better than other methods, the computational time and required resources are both high. Moreover, this technique is very sensitive to noise, especially in large-scale operations.

DETAILED DESCRIPTION

Embodiments of the disclosed technology generally pertain to detail enhancement and edge sharpening techniques that avoid overshooting, halo effects, and ringing artifacts, and deliver a processed image having rich details and sharp edges. Such techniques may include the utilization of various methods such as edge-preserving enhancement, local extrema enhancement, and digital transient improvement.

Edge-preserving enhancement techniques generally deal with image details without large gradients, so edges with large gradients may be preserved and, thus, no halo effect is provoked. Local-extrema based enhancement techniques generally deal with details and edges with large gradients. Digital transient improvement techniques may be applied to change transitional edges from smooth to sharp.

Framework of Image Detail Enhancement and Edge Sharpening Techniques without Overshooting Image detail enhancement and edge sharpening techniques that avoid overshooting may be accomplished by way of an algorithm includes three parts: edge-preserving enhancement, local extrema enhancement, and digital transition improvement. Such an algorithm can deal with luminance (Y) and chroma (Cb, Cr) channels respectively. Because human vision is generally more sensitive to luminance than chroma, enhancement only may be implemented for luminance.

Figure 1:
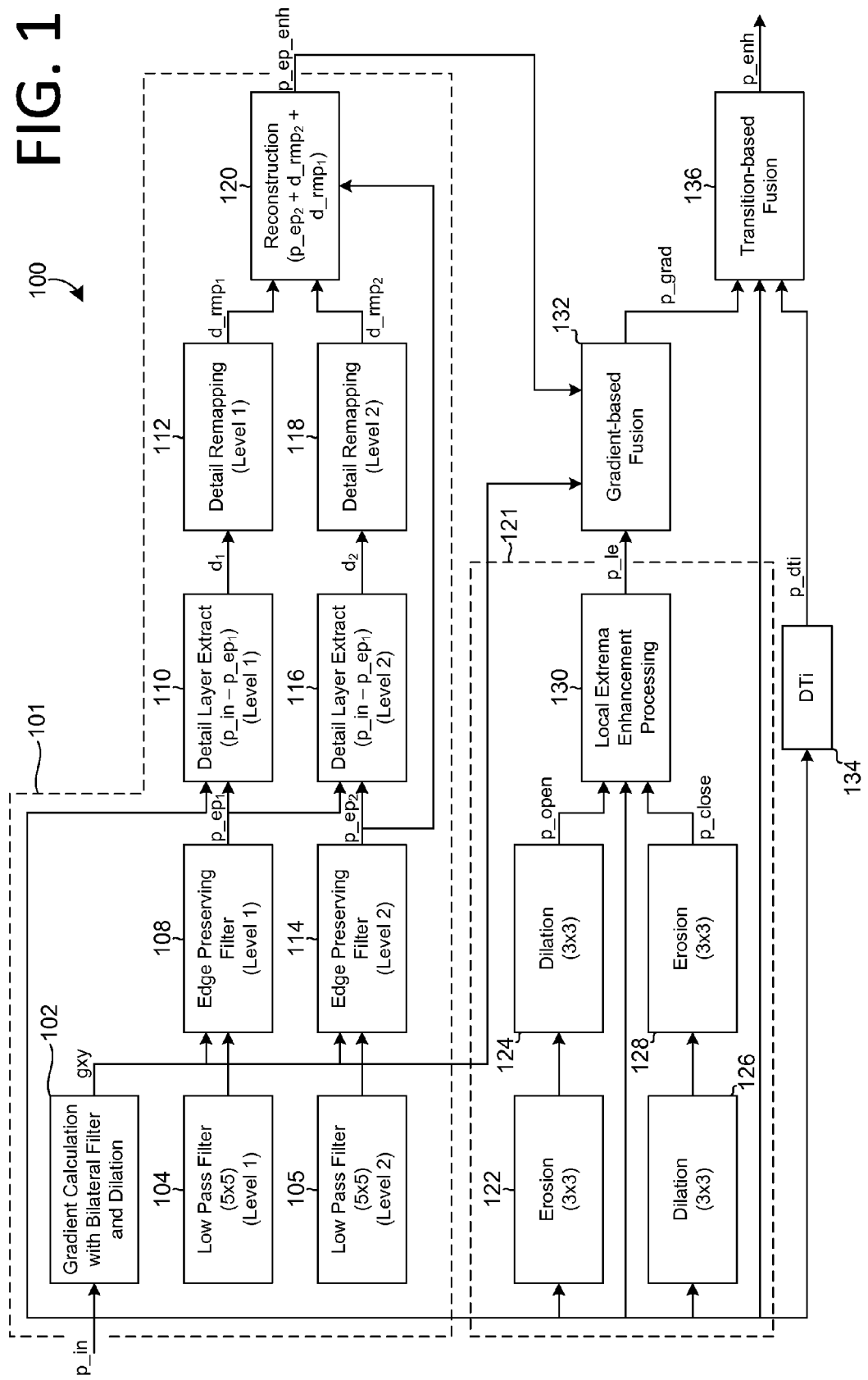
FIG. 1 illustrates an example of a detail enhancement and edge sharpening framework according to certain embodiments of the disclosed technology.

FIG. 1 illustrates an example of a detail enhancement and edge sharpening framework 100 according to certain embodiments of the disclosed technology. The framework 100 includes an edge-preserving enhancement block 101, a local extrema enhancement block 121, and a gradient-based fusion block 132. In the example, the framework 100 also includes a digital transient improvement (DTi) block 134 and a transition-based fusion block 136.

Edge-Preserving Enhancement Block

The edge-preserving enhancement block 101 generally deals only with image details without large gradients. The edge-preserving enhancement block 101 first decomposes an image I into K levels. The image of level (i+1) is generally coarser than that of level i except for edges, i.e., i=0, 1, . . . , K−1. In all of these levels, the details may be smoothed while any edges may be preserved as those in original image.

Whereas current techniques may use a global-optimization WLS framework to achieve edge-preserving smoothness, the computational time and cost of which are significant, the edge-preserving enhancement block 101 may achieve edge-preserving smoothness by simple edge-adaptive low pass filtering in local windows. Thus, no optimization technique is required and there is greater control over the preservation of edges.

Figure 2:
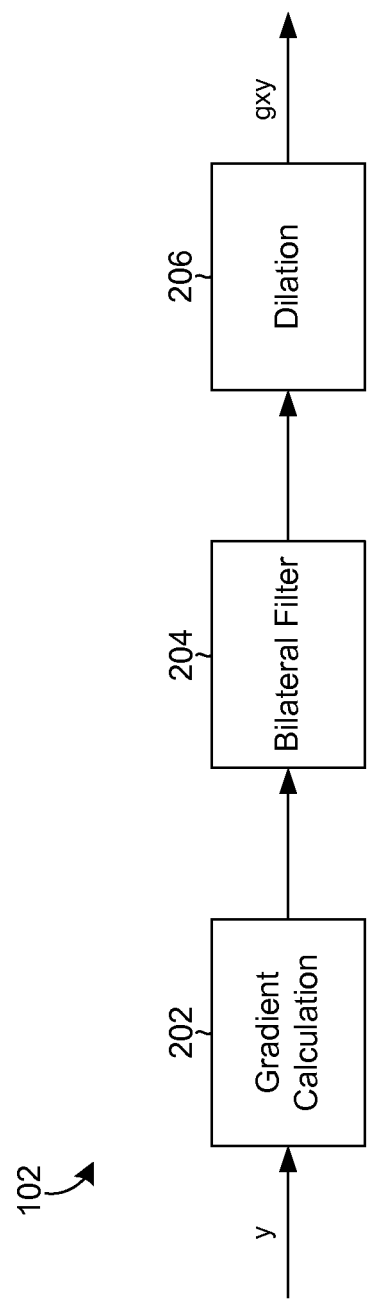
FIG. 2 illustrates a process of gradient calculation with bilateral filtering and dilation filtering.

In the example, the edge-preserving enhancement block 101 has a gradient calculation with bilateral filtering and dilation filtering block 102. FIG. 2 illustrates a detailed example of the gradient calculation with bilateral filtering and dilation filtering block 102. In the example, the gradient calculation with bilateral filtering and dilation filtering block 102 has a gradient calculation block 202, a bilateral filtering 204, and a dilation filtering block 206.

The gradient calculation block 202 of the gradient calculation with bilateral filtering and dilation filtering block 102 may perform a gradient calculation in which, for a given pixel p(r, c), the gradient may be calculated based on its forward difference as shown below:

$$gx = p(r, c+1) - p(r, c);$$

$$gy = p(r+1, c) - p(r, c);$$

$$r\_gxy = \max(\operatorname{abs}(gx), \operatorname{abs}(gy)).$$

where r_gxy is the raw gradient of pixel p(r, c).

The bilateral filtering 204 of the gradient calculation with bilateral filtering and dilation filtering block 102 may be used to refine the raw gradients. For a pixel p(r, c) with gradient r_gxy(r, c), gradients in a 3×5 window surrounding the pixel p(r,c) may be fetched and the weights may be computed based on gradient difference and spatial distance, for example.

The weight may be computed based on gradient difference by way of the following:

$$g\_wgt(s,t) = fg(abs(gxy\_raw(r,c) - gxy\_raw(s,t)))$$

where fg may be a monotone-decreasing exponential function.

The weight may be computed based on spatial distance by way of the following:

$$s\_wgt(s,t) = fs(\|(s-r,t-c)\|)$$

where fs may be a monotone-decreasing exponential function.

The weight for the bilateral filtering may be computed as follows:

$$b\_wgt(s,t) = g\_wgt(s,t) * s\_wgt(s,t)$$

The bilateral filtering 204 may then be determined by way of the following:

$$b\_gxy(r,c) = \frac{\sum_{(s,t) \in N(r,c)} b\_wgt(s,t) * r\_gxy(s,t)}{\sum_{(s,t) \in N(r,c)} b\_wgt(s,t)}$$

After bilateral filtering, the dilation filtering block 206 may replace the original gradient with a maximal gradient in a 3×3 neighborhood in a gradient field generated by the bilateral filtering 204.

In the example, K levels of low pass filtering with different smoothness are used. Here, K is 2. Each low pass filtering, such as 104 and 105, may be performed by convolving the input image with one low pass filter. From level 1 to level K, the corresponding low pass filters are more and more soft. So, the image results after low pass filtering become progressively coarser from level 1 to level K, i.e., more and more details are removed. Comparing 104 and 105, the result of 105 has fewer details (i.e., coarser) than that of 104.

Edge-preserving filterings 108 and 114 may be used to preserve the edge and detail with large gradient. For a pixel p, its low pass filtering result p_lpf may be determined from the low pass filtering sub-block. The 3×3 video data surrounding pixel p may be retrieved from the original input image, then the maximum p_max and minimum p_min in the window may be determined. The low pass filtering p_lpf may be limited to a range between p_min and p_max as follows:

$$p\_lpf = max(min(p\_lpf, p\_max), p\_min).$$

This logic aims to avoid that a pixel on one side of an edge is changed too much by the pixel on the other side of the edge after low pass filtering.

Based on the gradient value gxy, the blending weight between p and p_lpf may be solved. The larger the gradient is, the smaller the weight may be. This logic may be as follows:

if($gxy < Gxy\_Low\_Thr$)$wgt = 1$;

else if($gxy < Gxy\_High\_Thr$)$wgt = 1 - (gxy - GxyL\_Low\_Thr) * Gxy\_High\_Slope$;

else $wgt = Gxy\_High\_Gain - (gxy - Gxy\_High\_Thr) * Gxy\_Large\_Slope$;

$wgt = max(wgt, 0)$;

Here, Gxy_Low_Thr and Gxy_High_Thr are thresholds to control gradient interval partition. Gxy_High_Slope and Gxy_Large_Slope are slopes to adjust weight curve. And Gxy_High_Gain equals 1−(Gxy_High_Thr-Gxy_Low_Thr)*Gxy_High_Slope.

p and p_lpf may be blended as follows:

$$p\_ep = p + wgt * (p\_lpf - p).$$

After edge preserving filtering, the edges and details with large gradients are preserved while the rest pixels are smoothed, whose smoothness level is controlled by low pass filtering. Compared 108 and 114, the result of 114 is much smoother than that of 108.

In the example, the edge-preserving enhancement block 101 also includes multiple detail layer extraction blocks 110 and 116. For level 1, the detail may be defined as the difference between the input image I (i.e., whose pixels are p(r, c)) and the edge-preserving filtered image of level 1 (whose pixels are $p\_ep_1(r,c)$), in accordance with the following:

$$di(r,c) = p(r,c) - p\_ep_1(r,c).$$

For another level i (level 2 in the example), the detail may be defined as the difference between the edge-preserving filtered image of level i−1 (i.e., whose pixels are $p\_ep_{i-1}(r, c)$) and that of level i (i.e., whose pixels are $p\_ep_1(r, c)$), in accordance with the following:

$$d_i(r,c) = p\_ep_{i-1}(r,c) - p\_ep_i(r,c).$$

Detail remapping blocks 112 and 118 may use a remapping function to enhance details after they've been extracted in accordance with a remapping framework: for smooth regions and regions with large gradients, it is usually not appropriate to do enhancement so, in such situations, the details will generally remain unchanged; for other regions, however, enhancement may be performed. The basic remapping of detail may be calculated based on a sigmoid function as follows:

$$d\_brmp = Std * \left( \frac{1}{1 + exp(-alpha * d\_raw)} - 0.5 \right)$$

where d_raw refers to the original detail (i.e., $d_i(r, c)$) and d_brmp refers to the basic remapped detail.

The remapped details may be further adjusted based on the remapping framework noted above. First, the average detail level in the 3×3 neighborhood may be calculated as follows:

$$d\_avg = \left( d\_raw \otimes \begin{pmatrix} 1 & 2 & 1 \\ 2 & 4 & 2 \\ 1 & 2 & 1 \end{pmatrix} \right) / 16$$

Then, the weight for blending raw details and remapped details may be calculated in accordance with the following:

if($d\_avg < Detail\_Low\_Thr$)$d\_wgt = min((Detail\_Low\_Thr - d\_avg) * Detail\_Low\_K, 1)$;

else if($d\_avg < Detail\_High\_Thr$)$d\_wgt = 0$;

else $d\_wgt = min((d\_avg - Detail\_High\_Thr) * Detail\_High\_K, 1)$.

Here, Detail_Low_Thr and Detail_High_Thr are threshold to partition average detail interval, Detail_Low_K and Detail_High_K are gains to control blending weight.

The remapped details d_rmp may be adjusted by blending the raw details and basic remapped details in accordance with the following:

$$d\_rmp = d\_brmp + wgt*(d\_raw - d\_brmp).$$

A reconstruction block 120 may be used to reconstruct the image after the details have been remapped in each level. For an input pixel p, the result p_ep_enh by edge-preserving based enhancement is as follows:

$$p\_ep\_enh = p\_ep_K + \sum_{i=1}^{K} d\_rmp_i$$

Here, $p\_ep_K$ refers to the edge-preserving filtered result at level K and $d\_rmp_i$ refers to the remapped details at level i. p_ep_enh represents the enhanced output.

Local Extrema Enhancement Block

The local-extrema enhancement block 121 may be used to enhance details and edges with large gradients while avoiding artifacts such as overshooting, halo effect, and ringing. Whereas current techniques use multi-scale operators, the local-extrema enhancement block 121 uses only a single scale operator because the edge-preserving enhancement block 101 enhances many details and the residual parts are strong edges and details that can be enhanced in a small local window. So, the local-extrema enhancement block 121 advantageously preserves resources and provides faster processing times.

In the example, a first erosion block 122 and a first dilation block 124 may be used to process an open operator. For each pixel p(r, c), the first erosion block 122 may find the minimum pixel p_eros(r, c) in a 3×3 window of the input image. For each pixel p_eros(r, c), the first dilation block 124 may find the maximum pixel in a 3×3 window of the erosion image. The open result is p_open.

In the example, a second dilation block 126 and a second erosion block 128 may be used to process a close operator. For each pixel p(r, c), the second dilation block 126 may find the maximum pixel p_dila(r, c) in a 3×3 window of the input image. For each pixel p_dila(r, c), the second erosion block 128 may find the minimum pixel in a 3×3 window of the dilation image. The close result is p_close.

A local-extrema enhancement processing block 130 may be used to solve the delta between original input pixels p and open/close pixels in accordance with the following:

$$p\_open\_delta = p - p\_open;$$

$$p\_close\_detaI = p - p\_close;$$

The delta may then be synthesized as follows:

$$p\_delta = \max(\min(LE\_K*(p\_open\_delta + p\_close\_detal), LE\_Thr), -LE\_Thr);$$

Here, LE_K and LE_Thr are gain and threshold, respectively, to adjust the delta.

The processed pixel may then be outputted as follows:

$$p\_le = p + p\_delta$$

A gradient-based fusion sub-block 132 may be used to blend the results of the edge-preserving enhancement block 101 and those of local-extrema enhancement block 121. The blending weight wgt is same as that used by the edge-preserving filters 108 and 114.

The refined result may be generated by blending p_ep_enh and p_le as follows:

$$p\_grad = p\_ep\_enh + wgt*(p\_le - p\_ep\_enh).$$

A transient-based fusion sub-block 136 may be used to fuse the result of the gradient-based fusion sub-block 132 and that of a digital transient improvement (DTi) block 134.

The delta of the gradient-based fusion result p_grad and DTi result p_dti may be respectively calculated based on the input value p in accordance with the following:

$$delta\_grad = p\_grad - p$$

$$delta\_dti = p\_dti - p;$$

The sign of delta_grad and delta_dti may be checked and the blending delta blnd_delta may then be calculated as follows:

if both delta_grad and delta_*dti* are positive,
    blnd_delta=max(delta_grad,delta_*dti*);

else if both delta_grad and delta_*dti* are negative,
    blend_delta=min(delta_grad,delta_*dti*);

else blnd_delta=delta_grad+delta_*dti*.

The final enhancement result p_enh may be determined in accordance with the following:

$$p\_enh = p + blnd\_delta.$$

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method, comprising:
receiving an input image;
performing an edge-preservation enhancement on the input image, wherein performing the edge-preservation enhancement on the input image comprises performing a gradient calculation, bilateral filtering of gradients, and dilation of bilateral filtered gradients in the input image, wherein performing the gradient calculation, bilateral filtering of gradients, and dilation of bilateral filtered gradients in the input image comprises:
calculating a gradient for a pixel in the input image;
retrieving gradients in a window surrounding this pixel p;
doing bilateral filtering for gradients according to weights based on pixel difference and spatial distances;
determining a maximal gradient among the bilateral filtered gradients; and
replacing the gradient for the pixel with the maximal gradient;
performing a local-extrema enhancement on the input image;
performing a digital transient improvement (DTi) operation on the input image;
performing a gradient-based fusion of an output of the edge-preserving enhancement and an output of the local-extrema enhancement; and
performing a transient-based fusion of an output of the gradient-based fusion and an output of the DTi operation.

2. The method of claim 1, wherein performing the edge-preservation enhancement on the input image further comprises performing low-pass filtering on the input image.

3. The method of claim 2, wherein performing the edge-preservation enhancement on the input image further comprises smoothing the input image while preserving edges of the input image according to local gradients.

4. The method of claim 3, wherein performing the edge-preservation enhancement on the input image further comprises determining a first difference between the input image and the edge-preserved filtered image.

5. The method of claim 4, wherein performing the edge-preservation enhancement on the input image further comprises applying a first remapping function to the determined first difference.

6. The method of claim 5, wherein performing the edge-preservation enhancement on the input image further comprises determining a second difference between a first level of the edge-preserved filtered image and a second level of the edge-preserved filtered image.

7. The method of claim 6, wherein performing the edge-preservation enhancement on the input image further comprises applying a second remapping function to the determined second difference.

8. The method of claim 7, wherein performing the edge-preservation enhancement on the input image further comprises performing a reconstruction based on outputs of a second level of the edge-preserved filtered image and the first and second remapping functions.

9. The method of claim 1, wherein performing the local-extrema enhancement on the input image comprises:
determining an open operator;
determining a close operator; and
solving a delta based on the open operator and close operator.

10. One or more tangible, non-transitory computer-readable media storing computer-executable instructions that, when executed by a processor, perform the method recited by claim 1.

* * * * *

UNITED STATES PATENT AND TRADEMARK OFFICE
CERTIFICATE OF CORRECTION

PATENT NO. : 9,305,338 B1
APPLICATION NO. : 14/106448
DATED : April 5, 2016
INVENTOR(S) : Guodong Liu et al.

It is certified that error appears in the above-identified patent and that said Letters Patent is hereby corrected as shown below:

IN THE SPECIFICATION

In column 3, line 61, replace "GxyL_Low" with -- Gxy_Low --;
In column 4, line 21, replace "di(r,c)" with -- $d_1(r,c)$ --;
In column 5, line 49, replace "p_close_detaI" with -- p_close_detal --.

Signed and Sealed this
Fourteenth Day of June, 2016

Michelle K. Lee
*Director of the United States Patent and Trademark Office*